United States Patent
Pandit et al.

(10) Patent No.: US 7,631,341 B2
(45) Date of Patent: Dec. 8, 2009

(54) EXTENSIBLE SECURITY ARCHITECTURE FOR AN INTERPRETIVE ENVIRONMENT

(75) Inventors: Bhalchandra S. Pandit, Redmond, WA (US); James W. Truher, III, Bellevue, WA (US); Jeffrey P. Snover, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 882 days.

(21) Appl. No.: 11/118,971

(22) Filed: Apr. 28, 2005

(65) Prior Publication Data

US 2006/0248574 A1 Nov. 2, 2006

(51) Int. Cl.
*G06F 21/00* (2006.01)
(52) U.S. Cl. .......................................................... 726/1
(58) Field of Classification Search ...................... 726/1, 726/11, 22; 717/115, 117
See application file for complete search history.

(56) References Cited

U.S. PATENT DOCUMENTS

| | | | |
|---|---|---|---|
| 5,404,528 A | 4/1995 | Mahajan | |
| 6,078,743 A | 6/2000 | Apte et al. | |
| 6,292,936 B1 | 9/2001 | Wang | |
| 6,651,241 B1 | 11/2003 | Hernandez, III | |
| 6,718,371 B1 | 4/2004 | Lowry et al. | |
| 6,785,685 B2 | 8/2004 | Soetarman et al. | |
| 6,823,504 B1 | 11/2004 | Sokolov | |
| 6,848,101 B2 | 1/2005 | Maekawa et al. | |
| 6,880,125 B2 | 4/2005 | Fry | |
| 6,950,866 B1 | 9/2005 | Lowry et al. | |
| 7,284,274 B1* | 10/2007 | Walls et al. ..................... 726/25 |
| 2002/0073330 A1* | 6/2002 | Chandnani et al. .......... 713/200 |
| 2002/0078382 A1* | 6/2002 | Sheikh et al. ............... 713/201 |
| 2003/0200349 A1 | 10/2003 | Hansen | |
| 2004/0068715 A1 | 4/2004 | Wong et al. | |
| 2004/0153967 A1 | 8/2004 | Bender et al. | |
| 2004/0210828 A1 | 10/2004 | Langer | |
| 2005/0071369 A1 | 3/2005 | Lang et al. | |
| 2005/0108518 A1* | 5/2005 | Pandya ........................ 713/151 |
| 2005/0182958 A1* | 8/2005 | Pham et al. .................. 713/200 |

OTHER PUBLICATIONS

Eric Flower, "Step-Up to MS-DOS 6.2: An Early Look at Microsoft's Latest Upgrade", Computer in Libraries, vol. 14, No. 2, pp. 30-32, Feb. 1994.

Linthicum, D.S, "Java Development Environments Evolve", Object Magazine, vol. 8, No. 4, pp. 45-46, 48-49, Jun. 1998.

(Continued)

*Primary Examiner*—Ellen Tran
(74) *Attorney, Agent, or Firm*—Lee & Hayes, PLLC (57) ABSTRACT

The Techniques and Mechanisms Described Herein are Directed to an Extensible security architecture that provides a security mechanism for minimizing security problems within interpretive environments. The extensible security architecture comprises a script engine configured to process a script and a security manager configured to monitor the processing of the script based on a security policy. The security manager determines whether to open an assembly associated with a command within the script, whether to process the command, whether to allow certain input to the command, and the like. The security policy may be implemented by overriding one or more methods of a base security class that are called when processing the script. The input may be an object passed via an object-based pipeline.

21 Claims, 4 Drawing Sheets

OTHER PUBLICATIONS

Andrew Tucker, "Windows CE's CESH Utility", Dr. Dobb's Journal, vol. 25, No. 5, http://www.ddj.com, pp. 74-80, May 2000.

"Command Line Tailors Software to Buying Operations", Purchasing Software News, vol. 127, No. 4, pp. 153-156, Sep. 1999.

Brun et al., "ROOT-An Object Oriented Data Analysis Framework", Nuclear Instruments & Methods in Physics Research, Section A, vol. 389, No. 1-2, pp. 81-86, Apr. 1997.

Dominic Olivastro, "Modifying DCL Commands in VAX/VMS: The Command Definition Utility", The VAX Professional, vol. 8, pp. 50-53, Apr. 1986.

Sorzano, et al., "Command-Line Interfaces Can Be Efficiently Brought to Graphics: COLIMATE (the COmmand LIne MATE)", Software-Practice and Experience, vol. 32, No. 9, pp. 873-887, Mar. 2002.

"No Time for GUI's", Digital Systems Report, Computer Electronics, Inc., vol. 19, No. 4, pp. 1-4, Winter 1997.

Tom Yager, "Taking Command Of Windows NT", Unix Review, vol. 15, No. 11, pp. 31-32, 34, 36, 38, 40, Oct. 1997.

Randy Dykhuis, "Beefing Up Dos with 4DOS", Computers in Libraries, vol. 11, No. 4, pp. 35-37, Apr. 1991.

Giles Todd, "Installing MS-DOS Device Drivers from the Command Line", EXE, vol. 4, No. 3, pp. 16-21, Aug. 1989.

Jaeger, et al, "Support for the File System Security Requriements of Computational E-Mail Systems", ACM, 1994, pp. 1-9.

Kc, et al, "Countering Code-Injection Attacks with Instruction-Set Randomization", ACM, CC'03, Oct. 27-31, 2003, pp. 272-280.

"Intro to Unix: Pipes and Filters", Dec. 15, 2001, retrieved from the internet at http://web/archive/org/20011216234529/http://www.december.com/unix/tutor/pipesfilters.html on Jul. 28, 2008, 2 pgs.

Ramey, et al., "Bash Reference Manual", retrieved from <<http://gd.tuwien.ac.at/utils/shells/bashref.pdf>> on Jul. 25, 2008, Nov. 2001, pp. 1-132.

Varian, "Plunging into Pipes", Proceedings SHARE Europe AM91, Oct. 7, 1991, pp. 1087-1110.

\* cited by examiner

EXTENSIBLE SECURITY ARCHITECTURE FOR AN INTERPRETIVE ENVIRONMENT

TECHNICAL FIELD

This document generally relates to interpretive environments, and more particularly, to security mechanisms for interpretive environments.

BACKGROUND

Interpretive environments, also commonly referred to as shells, allow system administrators to automate tasks through the use of scripts. Shell scripting languages are used to write the scripts. Because many of the scripting languages and shells date back to before the Internet boom, they were not designed for warding off attacks by malicious individuals seeking to exploit vulnerabilities within the scripts and/or within the shell. These attacks include overrunning buffers, inserting unexpected text/code in the input to the script, inserting unexpected code for execution, and the like.

In order to provide a more secure interpretive environment in the new Internet era, several different approaches have been developed. For instance, in one approach, certain commands within the shell have been disabled when used within a script. However, by doing so, the portability of the shell script is affected. In another approach, special purpose code is added into different commands of the shell. This special purpose code then performs additional security checking. However, this approach is very time consuming and may potentially overlook certain commands, thereby, leaving potential vulnerabilities exposed. In addition, as new security issues arise (e.g., authorization checks, validating signatures), the time consuming approach for adding new special purpose code and/or modifying that code must be undertaken again.

Thus, a more versatile solution is needed for minimizing security problems within interpretive environments.

SUMMARY

The techniques and mechanisms described herein are directed to an extensible security architecture that provides a security mechanism for minimizing security problems within interpretive environments. The extensible security architecture comprises a script engine configured to process a script and a security manager configured to monitor the processing of the script based on a security policy. The security manager determines whether to open an assembly associated with a command within the script, whether to process the command, and whether to allow certain input to the command. The security policy may be implemented by overriding one or more methods of a base security class that are called when processing the script. The input may be an object passed via an object-based pipeline.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

Briefly, the present extensible security architecture provides a security mechanism for minimizing security problems within interpretive environments. The extensible security architecture can be customized to accommodate new security features and to accommodate different operating environments. These and other advantages will become clear after reading the following detailed description.

Exemplary Computing Environment

Figure 1:
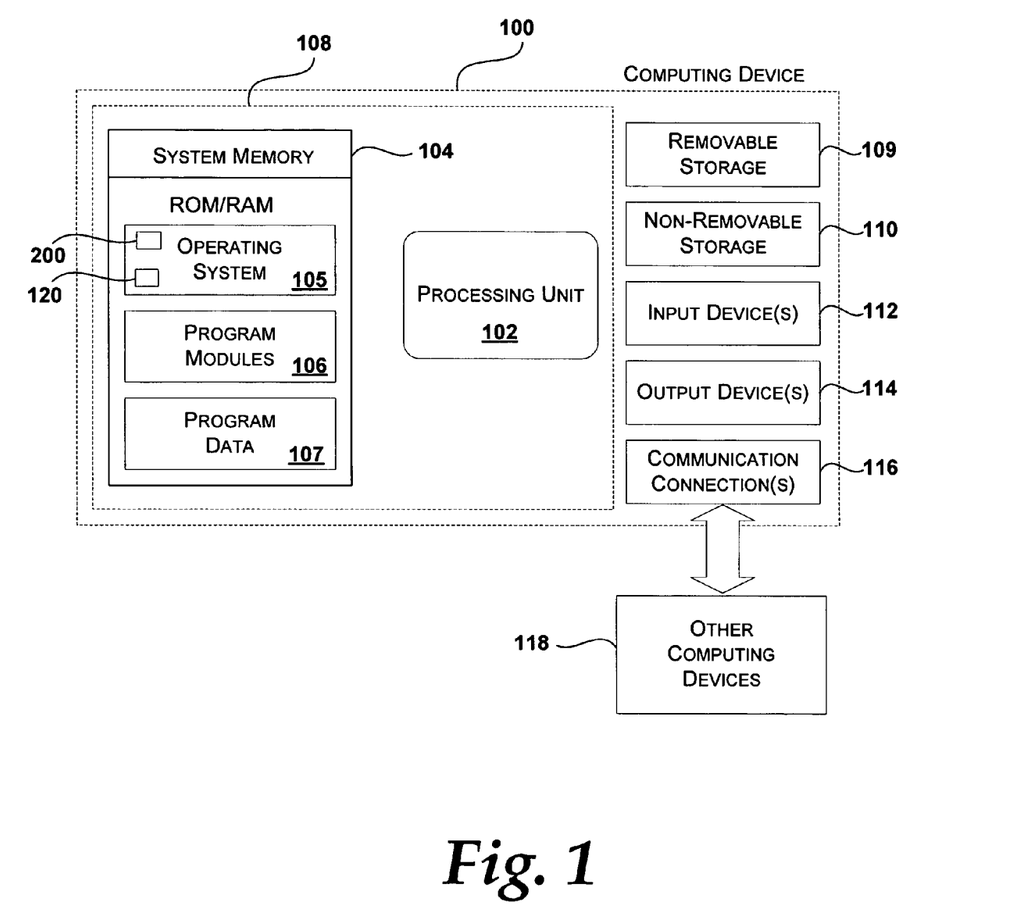
FIG. 1 is an illustrative computer environment that may be used to implement the extensible security architecture described herein.

The various embodiments of the present extensible security architecture may be implemented in different computer environments. The computer environment shown in FIG. 1 is only one example of a computer environment and is not intended to suggest any limitation as to the scope of use or functionality of the computer and network architectures. Neither should the computer environment be interpreted as having any dependency or requirement relating to any one or combination of components illustrated in the example computer environment.

With reference to FIG. 1, one exemplary system for implementing the security architecture includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. This basic configuration is illustrated in FIG. 1 by those components within dashed line 108. For the present security architecture, the operating system 105 includes a component-based framework 120 that supports components (including properties and events), objects, inheritance, polymorphism, reflection, and provides an object-oriented component-based application programming interface (API), such as the .NET™ Framework manufactured by Microsoft Corporation, Redmond, Wash. The operating system 105 also includes an administrative tool framework 200 that interacts with the component-based framework 120.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer-readable instructions, data structures, program modules, or other data. System memory 104, removable storage 109 and non-removable storage 110 are all examples of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well known in the art and need not be discussed at length here.

Computing device 100 may also contain communication connections 116 that allow the device to communicate with other computing devices 118, such as over a network. Communication connection(s) 116 is one example of communication media. Communication media may typically be embodied by computer-readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both storage media and communication media.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

Figure 2:
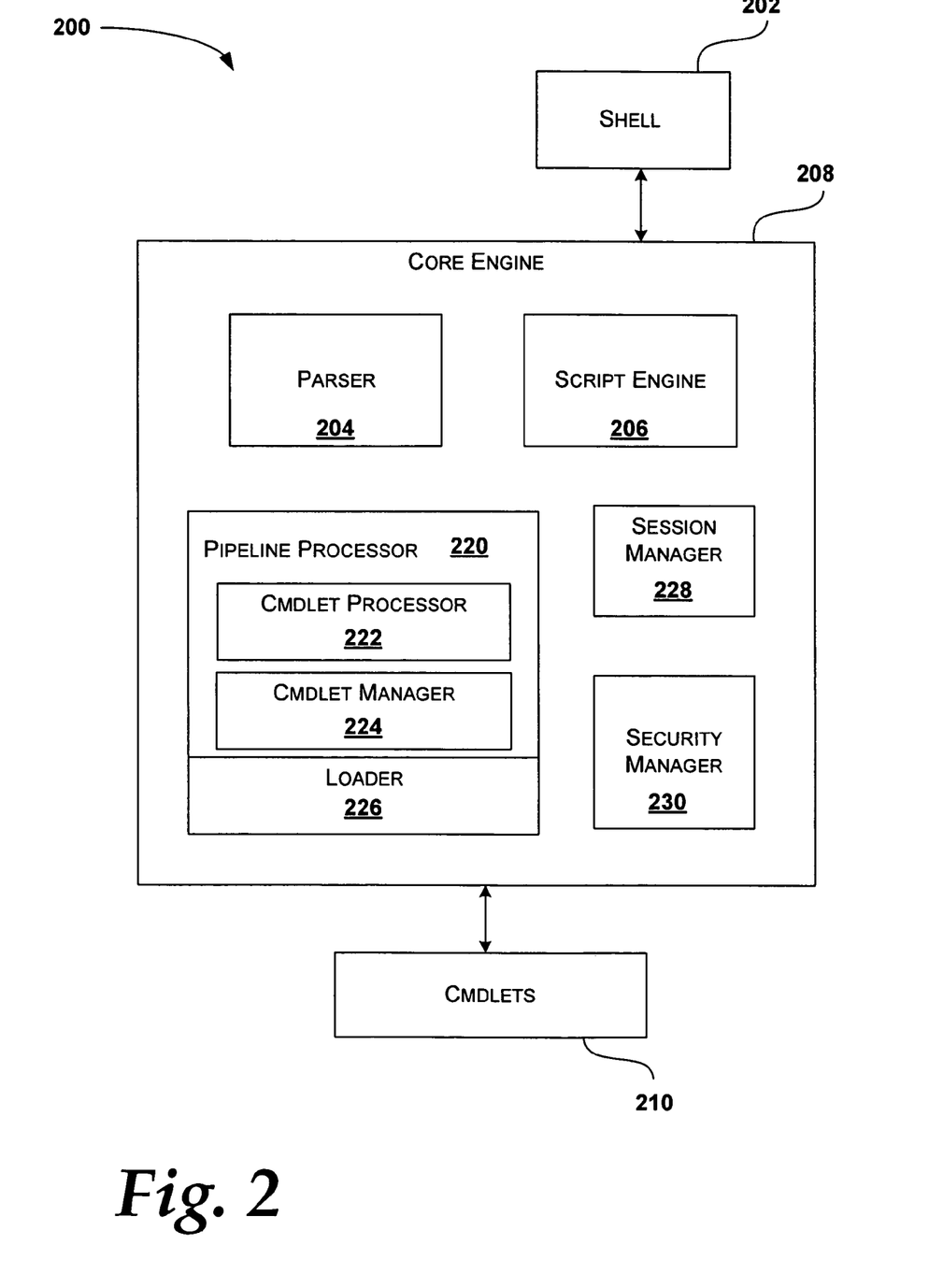
FIG. 2 is a functional block diagram illustrating computer-readable components for implementing the extensible security architecture described herein.

FIG. 2 is a functional block diagram illustrating salient components of one environment (i.e., an exemplary administrative tool framework 200) in which the present extensible security architecture, represented as security manager 230, may be implemented. After reading the following description, those skilled in the art will appreciate that the present extensible security architecture may also be implemented within other interpretive environments.

The salient components of the exemplary administrative tool framework include a shell 202, a core engine 208, and cmdlets 210. Each of these components may be one or more software modules implemented within the operating system 105 illustrated in FIG. 2, or as one or more program modules 106 illustrated in FIG. 2, or some combination of the two.

Cmdlets 210 represent any available command to the administrative tool framework. The available commands may by management commands that query or manipulate configuration information associated with the computing device, non-management commands that group, sort, filter, and perform other processing on input/output information, or the like. Cmdlets correspond to commands in traditional administrative environments. However, cmdlets are quite different than these traditional commands. For example, cmdlets are typically smaller in size than their counterpart commands because the cmdlets can utilize common functions provided by the administrative tool framework, such as parsing, data validation, error reporting, and the like. Because such common functions can be implemented once and tested once, the use of cmdlets throughout the administrative tool framework allows the incremental development and test costs associated with application-specific functions to be quite low compared to traditional environments. Cmdlets may run in the same processes within the administrative tool framework. This allows cmdlets to exchange "live" objects between each other. This ability to exchange "live" objects allows the cmdlets to directly invoke methods on these objects.

Shell 202 is a host program that exposes automation features to users via a command line and/or scripting language. The shell uses a set of interfaces made available by a host to embed the administrative tool environment. The shell manages interactions between a user and other components within the administrative tool framework.

The core engine 208 includes a parser 204, a script engine 206, a pipeline processor 220, a loader 226, a session manager 228, and the present security manager 230. The parser 204 provides mechanisms for receiving input requests from various host programs (e.g., shell 202) and mapping the input requests to uniform cmdlet objects that are used throughout the administrative tool framework. In addition, the parser 204 may perform data processing based on the input received.

The script engine 206 provides mechanisms and services to tie multiple cmdlets together using a script. A script is an aggregation of command lines that share session state under strict rules of inheritance. The multiple command lines within the script may be executed either synchronously or asynchronously, based on the syntax provided in the input request. The script engine 206 has the ability to process control structures, such as loops and conditional clauses and to process variables within the script. The script engine also manages session state and gives cmdlets access to session data based on a policy (not shown).

The session manager 228 supplies session and state information to other components within the administrative tool framework 200. The state information managed by the session manager may be accessed by any cmdlet, host, or core engine via programming interfaces. These programming interfaces allow for the creation, modification, and deletion of state information.

The loader 226 is configured to load each cmdlet in memory in order for the pipeline processor 220 to execute the cmdlet. The pipeline processor 220 includes a cmdlet processor 222 and a cmdlet manager 224. The cmdlet processor 222 dispatches individual cmdlets. If the cmdlet requires execution on a remote, or a set of remote machines, the cmdlet processor 222 coordinates the execution with a remoting cmdlet. The cmdlet manager 224 handles the execution of aggregations of cmdlets. The cmdlet manager 224, the cmdlet processor 222, and the script engine 206 communicate with each other in order to perform the processing on the input received from the host program (e.g., shell 202). The communication may be recursive in nature. For example, if the shell provides a script, the script may invoke the cmdlet manager 224 to execute a cmdlet, which itself may be a script. The script may then be executed by the script engine 206.

The present security manager 230 authorizes which actions are allowed within the administrative tool environment based on a security policy. This authorization may be at a session level, an assembly level, a cmdlet level, and/or an object level for objects passed via the pipeline. Briefly, illustrated in FIGS. 3-4 and described in conjunction therewith, the security manager 230 is implemented in a manner that allows different domains to each define a security policy for determining which actions can be performed. Thus, the other components of the administrative tool environment (e.g., shell 202, script engine 206, parser 204, loader 226, and pipeline processor 220) do not need to change when additional security controls are desired.

Figure 3:
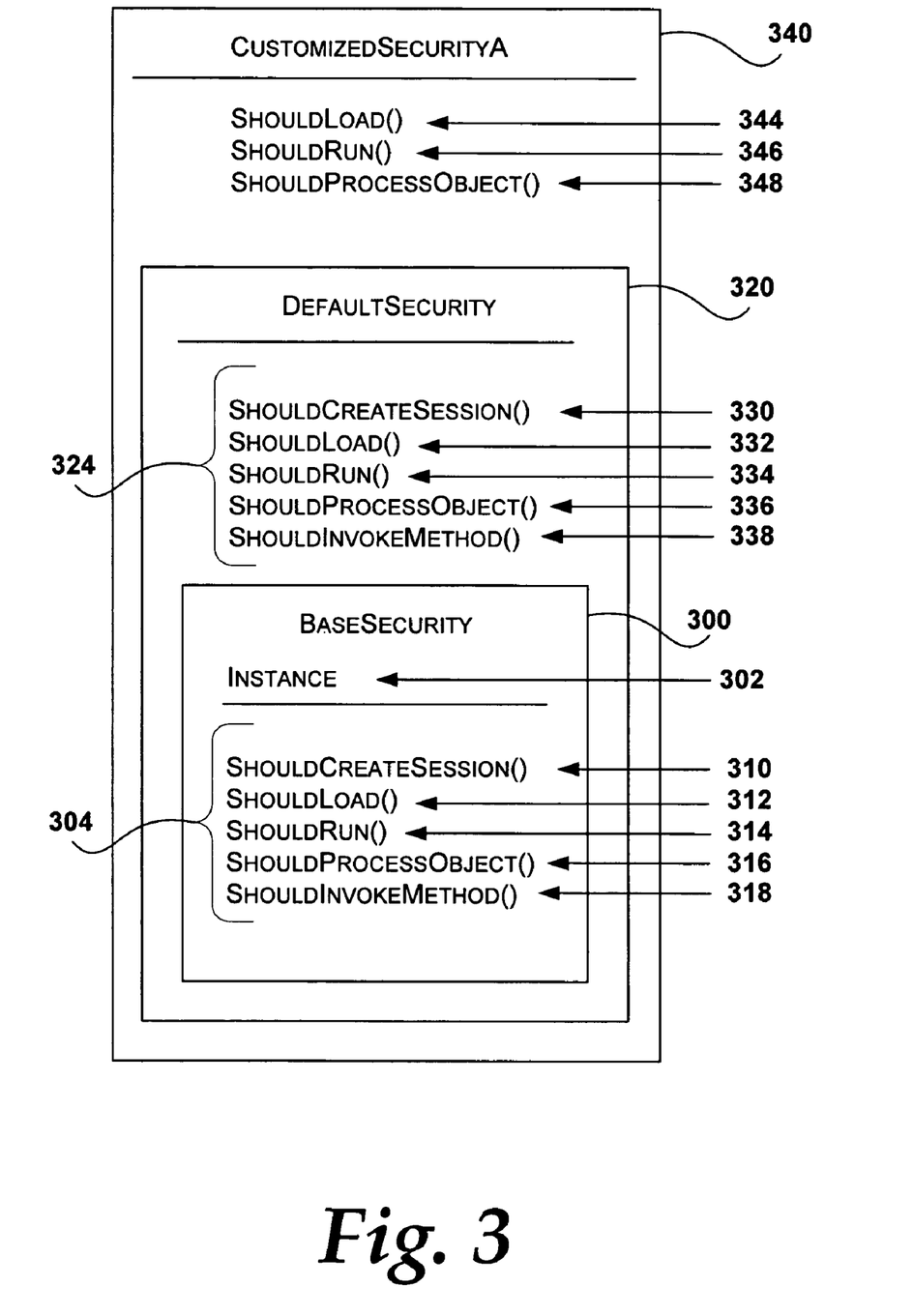
FIG. 3 is a graphical representation of the security mechanisms provided by the extensible security architecture shown in FIG. 2.

FIG. 3 is a graphical representation of the security mechanisms provided by the extensible security architecture shown in FIG. 2. The security mechanism includes a base security class 300. An instance of this class is instantiated when the core engine is started. The core engine is configured to call the security manager to see whether certain actions can be performed. The base security class 300 includes an instance property 302 and a set of base security application programming interfaces (APIs) 304. The base security APIs 304 include a ShouldCreateSession API 310, a ShouldLoad API 312, a ShouldRun API 314, a ShouldProcessObject API 316, and a ShouldInvokeMethod API 318.

The ShouldCreateSession API 310 determines whether the core engine is allowed to run or not. Thus, even though the core engine may be loaded, the security manager may determine that it will not run. The following is an exemplary syntax for the ShouldCreateSession API 310:

public virtual bool ShouldCreateSession(IdReference user, out Exception reason).

The first parameter "user" specifies the user context that is requesting the creation of a runspace. ShouldCreateSession API 310 returns a value of true or false depending on whether the runspace creation is allowed or disallowed, respectively. The ShouldCreateSession API 310 sets a second parameter "reason" if the runspace creation is not allowed. The term runspace refers to an abstraction that allows the execution of pipelines in a well controlled manner without requiring the hosting environment to understand the underlying execution of cmdlets. The runspace provides a set of interfaces so that the hosting environment does not need access to the inner workings of the command execution.

ShouldLoad API 312 determines whether a particular assembly associated with the desired cmdlet should load or not. The following is an exemplary syntax for the ShouldLoad API 312:

public virtual bool ShouldLoad(string path, out Exception reason, UI hostUI).

The first parameter specifies a full path to the assembly and/or the assembly strong name. ShouldLoad API 312 returns a value of true or false depending on whether the specified assembly can be loaded or can not be loaded, respectively. The hostUI parameter may be used if it is necessary to prompt a user for authorization decision.

ShouldRun API 314 determines whether access to the desired cmdlet should be allowed and whether a script should be allowed to run. The following is an exemplary syntax for ShouldRun API 314:

```
public virtual bool ShouldRun(CommandInfo ci,
    CommandParameters[ ] parameters,
    CommandOrigin co,
    out Exception reason,
    UI hostUI).
```

The CommandInfo is a base class from which several classes are derived. The derived classes are specific to the executable type, such as a cmdlet, a script, and the like. Parameters is an optional argument that when specified identifies which command parameter values may be passed to the command as arguments. If the optional parameters are specified, the ShouldRun API uses the specified parameters in its determination. If the security policy allows execution, ShouldRun API 314 returns a value of true and sets the fourth parameter "reason" to null. If the security policy does not allow execution, ShouldRun API 314 returns a value of false and returns an exception instance in the fourth parameter "reason". The fifth parameter "hostUI" may be used if it is necessary to prompt the user for authorization decision. The third parameter "co" distinguishes local or remote cmdlets from cmdlets dispatched by the core engine directly. The third parameter "co" is useful when implementing certain security policies.

ShouldProcessObject API 316 determines whether to pass a specific object to a running cmdlet. The core engine calls ShouldProcessObject API 316 before an object is placed in the input pipe of a cmdlet and when a cmdlet calls ShouldProcess. The following is an exemplary syntax for ShouldProcessObject API 316:

```
bool ShouldProcessObject(CmdletInfo ci,
    object data,
    out Exception reason).
```

If the security policy allows the specified object to be passed to the specified cmdlet, ShouldProcessObject API 316 returns a value of true and sets the third parameter "reason" to null. If the security policy does not allow the specified object to be passed to the specified cmdlet, ShouldProcessObject API 316 returns a value of false and sets the third parameter "reason" to an exception instance.

ShouldInvokeMethod API 318 determines whether a method should be invoked on an object. The core engine calls ShouldInvokeMethod API 318 before dispatching a method call on an object from a running script. The following is an exemplary syntax for ShouldInvokeMethod API 318:

```
public virtual bool ShouldInvokeMethod(MethodInfo mi,
    object instance,
    object[ ] parameters;
    out Exception reason).
```

If the security policy allows the specified method to be called from a script, ShouldInvokeMethod API 318 returns a value of true and sets the third parameter "reason" to null. If the security policy does not allow the specified method to be called from a script, ShouldInvokeMethod API 318 returns a value of false and sets the fourth parameter "reason" to an exception instance.

Each of these APIs 310-318 may be a virtual method that needs to be implemented by a derived class in order for the security manager to function properly. In one embodiment, a default security class 320 may be provided. The default security class 320 may be derived from the base security class 300 to provide a set of corresponding default APIs 324 (e.g., ShouldCreateSession default API 330, ShouldLoad default API 332, ShouldRun default API 334, ShouldProcessObject default API 336, and ShouldInvokeMethod default API 338). The default security class 320 then enforces a standard security policy for any application. The default APIs 324 may be implemented to allow everything. By doing so, the core engine is able to run without enforcing any security policy if a customized security policy is not available.

However, different applications may have different security policies. For example, Application A may have CustomizedSecurityA policy. CustomizedSecurityA policy is a class 340 that may inherit from the default security class 320 (shown in FIG. 3) or may derive directly from the base security class 300. When deriving from default security class 320, Customized SecurityA class 340 may override one or more of the default APIs 324 for any security policy that differs with the security policy for the default security class 320. As shown, Customized security policy A has its own implementation of ShouldLoad API 344, ShouldRun API 346, and ShouldProcessObject API 348. If CustomizedSecurityA policy derives directly from the base security class 300, each of the APIs 310-318 may be overridden in accordance with the associated security policy, as explained above for the default security class 320.

As one can see, the present security architecture is extensible and can easily incorporate additional security policies without impacting the other components. This allows each application to define its own security policy and implement it through the use of the present security architecture.

Figure 4:
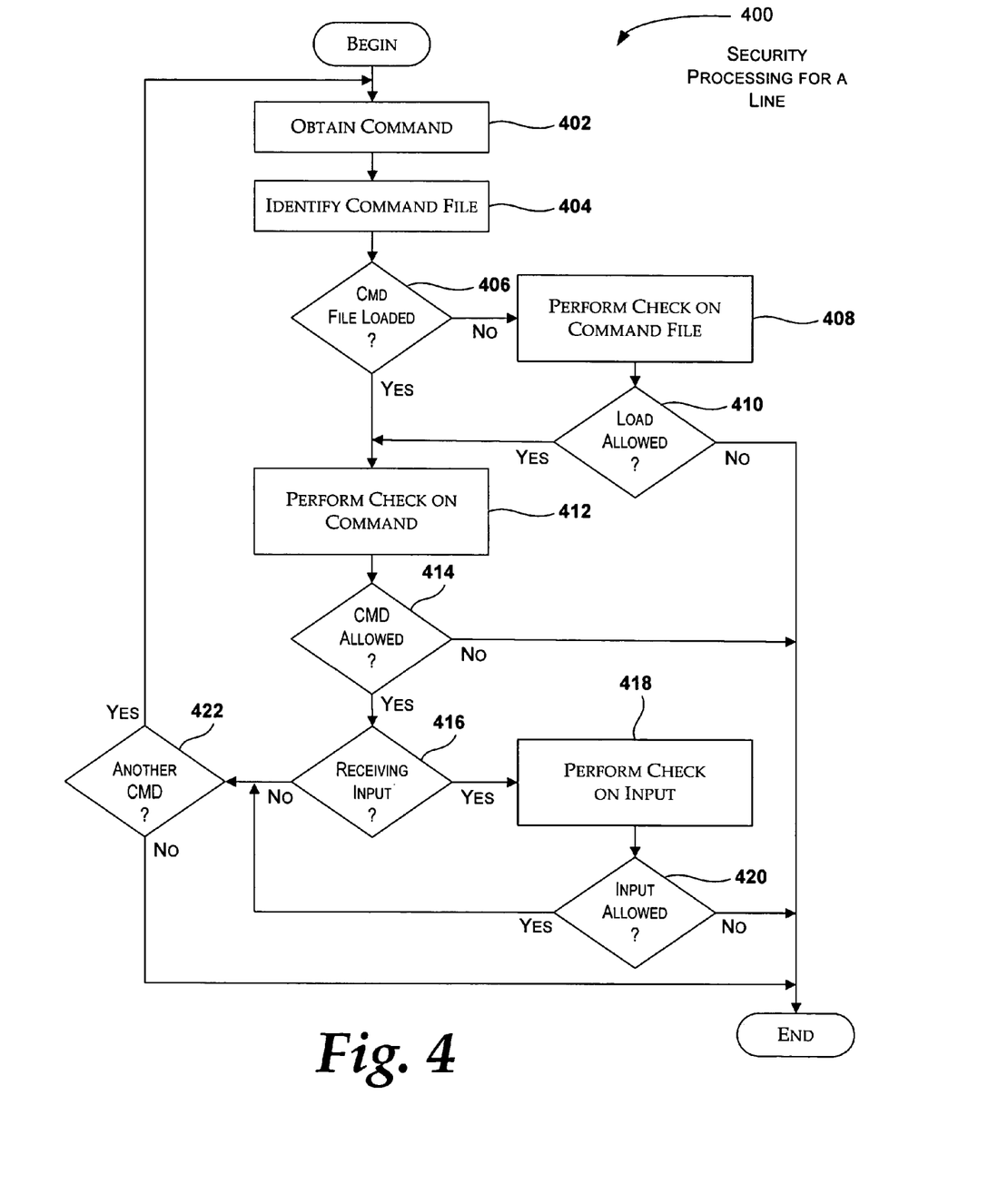
FIG. 4 is a flow diagram illustrating one embodiment of security processing implemented via the security mechanisms illustrated in FIG. 3.

FIG. 4 is a flow diagram illustrating one embodiment of security processing implemented via the security mechanisms illustrated in FIG. 3. The security processing will be described in conjunction with an example from a script as follows:

get-process a*|stop-process.

In overview, the above line gets each process beginning with the letter "a" and pipelines that process to the stop-process cmdlet which stops the process.

Security processing begins at block 402 where a command is obtained. For the above example, block 402 will obtain the command "get-process". Processing continues at block 404.

At block 404, an assembly associated with the command is identified. As one may already know, each assembly may have one or more commands identified within it. Continuing with the example, the assembly is identified as "ProcessCmds.dll". Processing continues at decision block 406.

At decision block 406, a determination is made whether the assembly has been previously loaded for a different command within the assembly. If the assembly has not been previously loaded, processing continues at block 408. Otherwise, processing continues at block 412.

At block 408, a check is performed on the assembly to determine whether the assembly can be loaded. The core engine calls ShouldLoad API to perform this check. The derived ShouldLoad API makes this determination based on the specified full path to the assembly and/or the assembly strong name. If the current security policy is set to be "signed", for example, the derived ShouldLoad API performs signature verification to determine whether to allow loading the assembly. Another policy may check whether the specified path is in the list of paths in the administrative tool's command path. Processing continues at decision block 410.

At decision block 410, if the check in block 408 failed, processing ends. Otherwise, the assembly is loaded and processing continues at block 412.

At block 412, a check is performed on the obtained command. The core engine calls the ShouldRun API to perform this check. As mentioned above, there may be several variations for implementing the ShouldRun API. For example, some security managers may have a security policy that requires checking security on commands coming from a host. If the commands coming from a host call other commands, the other commands may be directly allowed without doing any security checking. This and other variations for the ShouldRun API are envisioned. Processing continues at decision block 414.

At decision block 414, a determination is made whether the check in block 412 failed. If block 412 failed, processing ends. Otherwise, the command is allowed to begin running and emitting object. Processing continues at decision block 416.

At decision block 416, a determination is made whether the command is receiving objects emitted from other objects. Continuing with the above example, because the "get-process" command is the first command in the pipeline, "get-process" is not receiving any objects emitted from other objects. Therefore, processing continues to decision block 422.

At block 422, a determination is made whether there is another command. If there is another command, processing loops back to block 402 and proceeds as described above. Otherwise, processing ends.

Continuing with our example, there is another command. At block 402 the command "stop-process" is obtained. At block 404, the same assembly "ProcessCmds.Dll" is identified. Therefore, processing continues at block 412 as described above. The command "stop-process" is allowed to run. Processing continues at decision block 416.

This time because the "stop-process" command is receiving objects emitted from other objects, processing continues at decision block 418. At decision block 418, a check is performed on the input. The ShouldProcessObject API is called for each object being passed to the "stop-process" command. For this example, the security policy has been implemented so that any object that has a named property equal to "ace.exe" cannot be operated upon by the "stop-process" command. Thus, in our example, if the "get-process" command emitted a.exe, a1.exe, a2.exe, and ace.exe. All but ace.exe will be allowed to be processed. The processing with ace.exe will fail. Processing continues to decision block 422 and proceeds as described above.

Thus, one will note that the ShouldLoad API gets called once; the ShouldRun API gets called once for each command that is obtained from the assembly; and ShouldProcessObject API gets called for each object being passed to a command. It is important to note that each application can implemented its own security policy by overriding the desired security API. The actual implementation for the security policy may be as simplistic or as complex as needed. Thus, the present security architecture provides extensibility and can easily adapt to changes and advances in security processing.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

What is claimed is:

1. At least one tangible computer-readable medium storing computer-executable components, the computer-executable components comprising:
    a script engine implemented in a computing device, the script engine configured to process a script; and
    a security manager configured to:
        monitor the processing of the script based on a security policy by invoking one or more application programming interfaces (APIs);
        determine, via the computing device, whether to pass a first object to a running cmdlet before the first object is placed in the input pipe of the running cmdlet;
        determine, via the core engine, whether to invoke a method on a second object, the determination made before dispatching the method on the second object; and
        implement the security policy by overriding one or more default application programming interfaces (APIs) within a base security class.

2. The computer-readable medium of claim 1, wherein the security manager further monitors the processing of the script by determining whether to load an assembly associated with a command within the script based on whether a path to the assembly is listed in an administrative tools command path.

3. The computer-readable medium of claim 1, wherein the security manager further monitors the processing of the script by determining whether processing of a command within the script is allowed.

4. The computer-readable medium of claim 1, wherein the determining whether to pass a first object to a running cmdlet before the first object is placed in the input pipe of the running cmdlet is a virtual method implemented by a default security class derived from the security manager.

5. The computer-readable medium of claim 1, wherein the determining whether to pass a first object to a running cmdlet before the first object is placed in the input pipe of the running cmdlet comprises calling a ShouldProcessObject API.

6. The computer-readable medium of claim 5, wherein the security manager further monitors the processing of the script by determining whether to allow processing of a method associated with the object.

7. The computer-readable medium of claim 1, wherein the processing of the script occurs using an object-based pipeline.

8. The computer-readable medium of claim 1, wherein the security manager is further configured to determine whether to allow processing by the script engine.

9. A tangible computer-readable medium encoded with a data structure, the data structure comprising:
    a base security class that becomes instantiated for use by a shell engine, the base security class having a set of application programming interfaces (APIs) that are called by the shell engine to determine the extent of processing allowed by the shell engine based on a security policy, the set of APIs including a first API to determine whether to pass an object to a command before the object is placed in an input pipe of the command;
    a default security class derived from the base security class, the default security class including a default set of APIs corresponding set of APIs of the base security class; and
    a customized security class derived from the base security class, the customized security class to override one or more of the default set of APIs when the customized security policy differs from the default set of APIs.

10. The computer-readable medium of claim 9, wherein the set of APIs include at least one method out of the set comprising:
    a second method that when executed determines whether an assembly associated with a command should be loaded; and
    a third method that when executed determines whether the command should be run.

11. The computer-readable medium of claim 10, wherein the set of APIs further comprises a fourth method that when executed determines whether a method associated with the object should be invoked.

12. The computer-readable medium of claim 10, wherein the set of APIs further comprises another method that when executed determines whether the shell engine is allowed to operate.

13. The computer-readable medium of claim 10, wherein the customized security policy includes one or more APIs that correspond to the one or more APIs of the base security class.

14. The computer-readable medium of claim 10, wherein the third method determines whether the command should be run based on one or more arguments passed to the command.

15. The computer-readable medium of claim 13, wherein the one or more APIs of the customized security policy includes a ShouldProcessObject API to determine whether to pass a first object to a running cmdlet before the first object is placed in the input pipe of the running cmdlet.

16. The computer-readable medium of claim 9, further comprising an instance property that associates an instance of the data structure or a derived data structure to the processing for a script.

17. A system that provides an extensible security architecture for an interpretive environment, the system comprising:
    a processor; and
    a memory into which a plurality of computer-executable instructions are loaded, the plurality of instructions performing a method comprising:
        processing a script having at least one command; and
        monitoring the processing of the script via a set of interfaces extensible for implementing a customized security policy, the set of interfaces comprising a first interface that distinguishes local or remote commands from commands dispatched by a shell engine directly, the set of interfaces further comprising a second interface that determines whether to pass a first object to a running cmdlet before the first object is placed in the input pipe of the running cmdlet.

18. The system of claim 17, wherein processing the script occurs using an object-based pipeline.

19. The system of claim 17, wherein the set of interfaces comprises a set of methods within a base security class, the set of methods being inheritable by another class and being overridden to implement the customized security policy.

20. The system of claim 17, wherein the set of interfaces comprises a third interface that determines whether an assembly associated with the at least one command should be loaded.

21. The system of claim 20, wherein the first interface further determines whether the at least one command should be allowed to be processed.

* * * * *